March 25, 1958 H. M. SAWRIE 2,828,002
SLING CONVEYOR
Filed Nov. 9, 1955 3 Sheets-Sheet 1
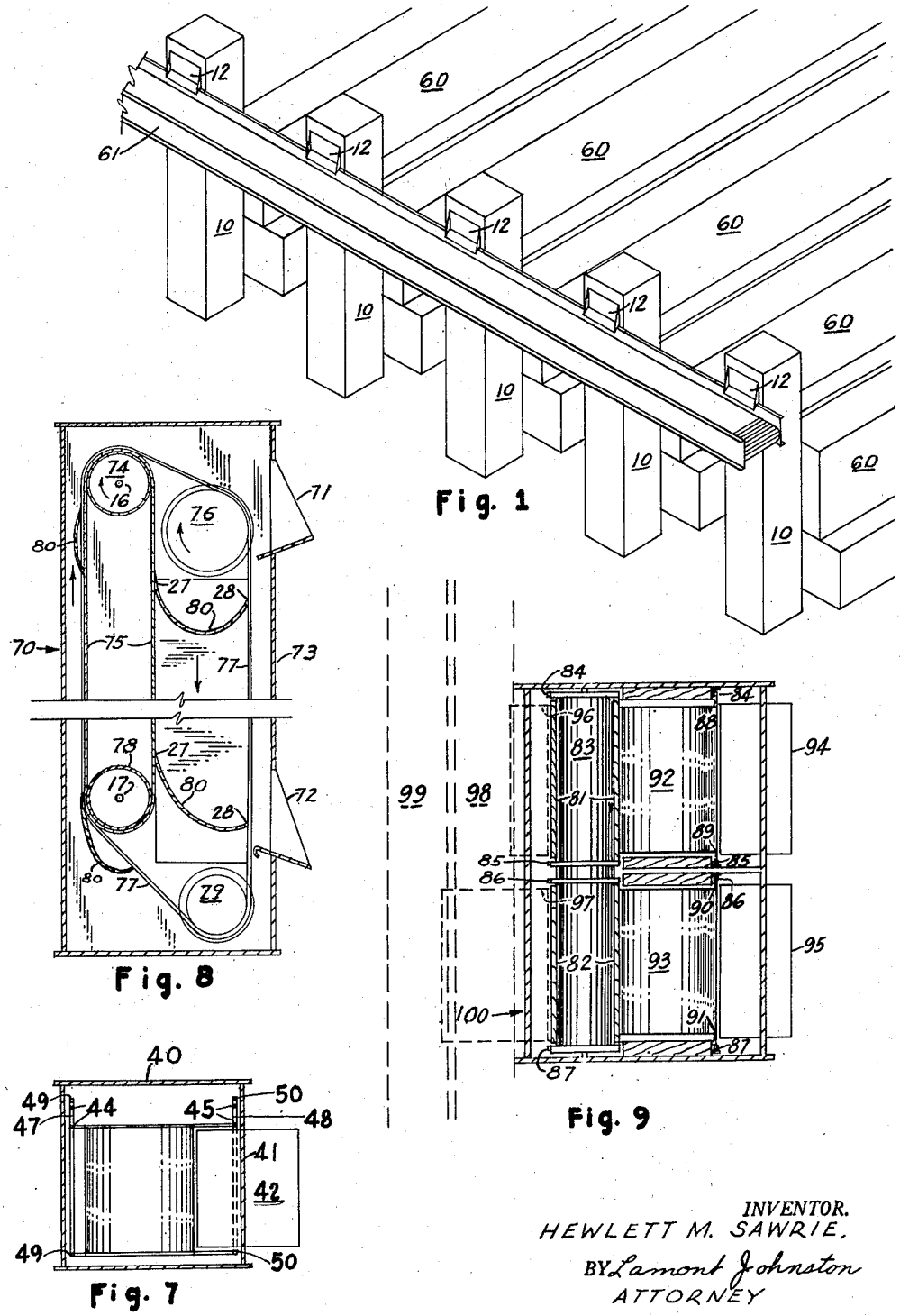
INVENTOR.
HEWLETT M. SAWRIE.
BY Lamont Johnston
ATTORNEY March 25, 1958  H. M. SAWRIE  2,828,002
SLING CONVEYOR Filed Nov. 9, 1955  3 Sheets-Sheet 2

INVENTOR.
HEWLETT M. SAWRIE
BY Lamont Johnston
ATTORNEY

March 25, 1958 H. M. SAWRIE 2,828,002
SLING CONVEYOR
Filed Nov. 9, 1955 3 Sheets-Sheet 3

INVENTOR.
HEWLETT M. SAWRIE
BY Lamont Johnston
ATTORNEY

United States Patent Office 2,828,002
Patented Mar. 25, 1958

2,828,002

SLING CONVEYOR

Hewlett M. Sawrie, Chattanooga, Tenn.

Application November 9, 1955, Serial No. 545,924

13 Claims. (Cl. 198—153)

This invention relates to a sling conveyor and more particularly to a sling conveyor used as an elevator.

Heretofore, sling conveyors have been used to convey loads of various types, such as bananas, dough, etc. from one station to another and have been provided with means to automatically unload the conveyor at a discharge station. However, in these devices, both sides of the slings have been suspended from a single belt or chain loop. Such sling conveyors operate satisfactorily under certain conditions as conveyances, but the mechanisms required for loading and unloading the slings are frequently unnecessarily complicated.

In the textile industry, threads and yarns are wound from one bobbin to another during processing and finally from bobbins to cones for shipment or to looms for weaving. The bobbins, generally of wood, are reused in the mill until repairs are needed or until they are completely worn beyond use. It is currently the practice in most mills for the bobbins to be accumulated at the end of each winding frame and at other points in boxes or receptacles, the bobbins being conveyed to the end of the frame by a double or single belt or chain conveyor powered by the motor operating the frame. The receptacle is then emptied at intervals into a box truck and pushed by hand to a truck storage area, where the bobbins are accumulated for re-use.

It is therefore an object of this invention to overcome the disadvantages enumerated by providing not only a novel sling conveyor but also an automatic conveyor system which will pick up loads, such as bobbins, at various points and discharge them into a centralized storage area.

Another object of this invention is to provide a unique sling conveyor used as an elevator, comprising two belt loops having a plurality of slings suspended therebetween.

Another object of this invention is to provide a novel means for discharging a load from the slings at the top of a sling conveyor used as an elevator.

Another object of this invention is to provide means for returning the empty slings to loading position in a relatively narrow space.

Another object of this invention is to provide in a sling conveyor used as an elevator means to allow an excessive load in one sling to spill over into a lower sling without binding the upward movement of the slings.

A further object of this invention is to provide a series of such elevators which will automatically convey used bobbins from a plurality of winding machines to a central disposal point.

Further objects and advantages of the invention will be apparent from the following description taken in conjunction with the drawings, wherein:

Fig. 1 is an isometric schematic view disclosing the system of elevating loads from a plurality of loading points and discharging the loads into a central disposal point;

Figure 3:
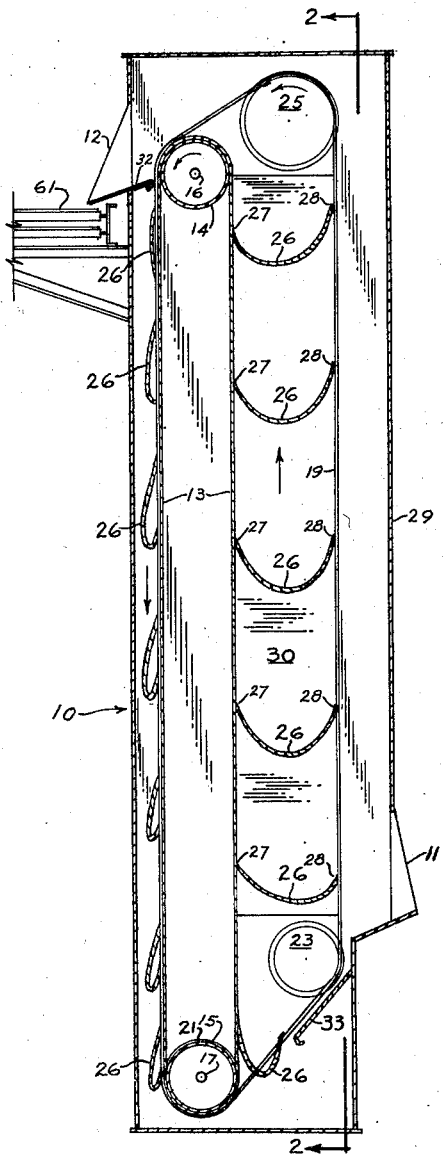
Figure 2:
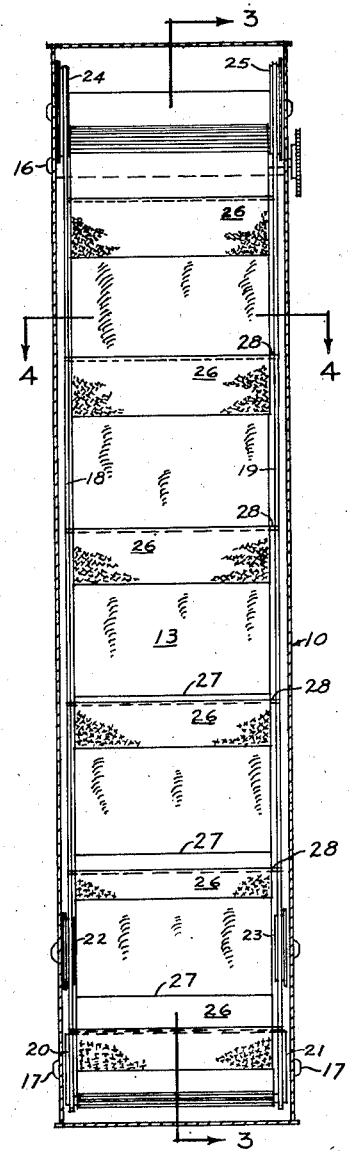
Fig. 2 is a front elevation section taken along the lines 2—2 of Fig. 3, and disclosing one modification of the invention.
Figure 4:
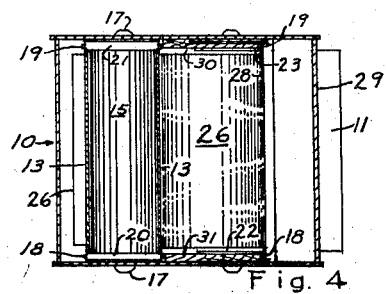
Figures 5, 6:
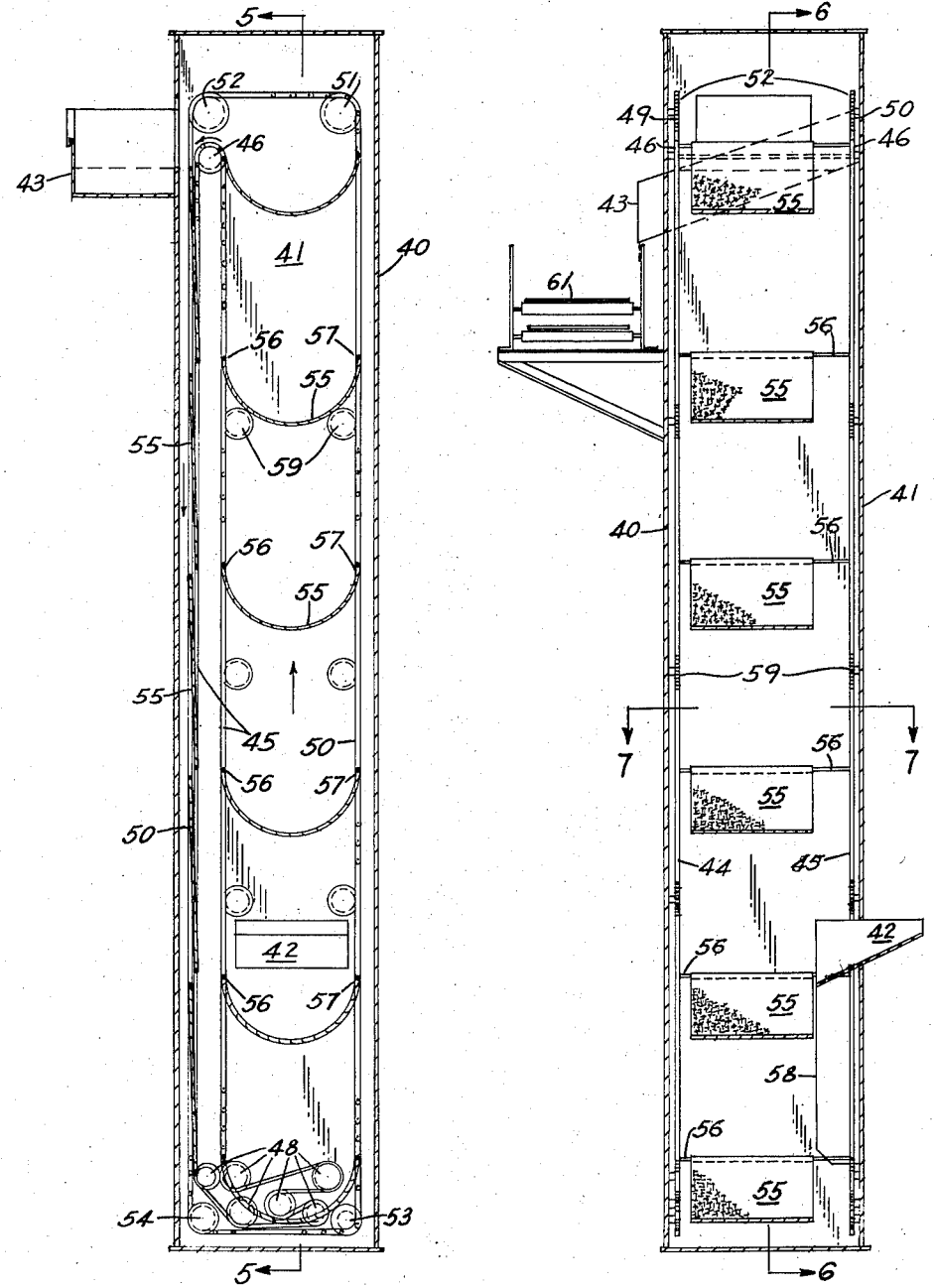

Fig. 3 is a section taken along the lines 3—3 of Fig. 2;
Fig. 4 is a section taken along the lines 4—4 of Fig. 2;
Fig. 5 is a front elevation section taken along the lines 5—5 of Fig. 6, and disclosing another modification of the invention;
Fig. 6 is a section taken along the lines 6—6 of Fig. 5;
Fig. 7 is a section taken along the lines 7—7 of Fig. 5;
Fig. 8 is a side elevation section similar to Fig. 3, disclosing another modification of the invention; and
Fig. 9 is a plan section similar to Fig. 4 of a modification including a double conveyor.

Briefly stated, the invention comprises a sling conveyor in which a plurality of spaced flexible slings are elevated in open load-supporting positions, discharged at the top of the elevator by stretching and inclining the flexible slings, and lowering the slings in a comparatively narrow space by either stretching the slings to near vertical position or collapsing the slings until they resume an open position for reloading at the bottom of the elevator. The means for carrying out these operations comprise a pair of belt loops, one loop being entirely inside the other loop. Each sling is supported by and between the two belt loops. The upward moving portions of both belts are parallel to each other and spaced sufficiently apart that the ascending slings assume an open load-supporting position. By spacing the descending portions of the belt loops very close to each other, the return of the slings may be conducted in a very small space. A head roller or pulley over which the inside loop must travel is spaced slightly lower than the head roller or pulley over which the outside loop must travel. As a sling passes over the head roller, it is simultaneously stretched and inclined to discharge its load at the top of the elevator. By providing a liberal spacing between the front wall of the elevator housing and the outside belt loop, excessive loads from any sling may spill over into a lower sling at the loading chute. The invention also contemplates the lowering as well as the elevating of loads.

This invention also contemplates the use of a plurality of the above-described elevators in series in such a manner that a plurality of loads may be simultaneously elevated and discharged into a single conveyor which will carry the loads to a central disposal point.

Referring now to the drawings in more detail, Figs. 2, 3 and 4 disclose one modification of the invention in which an elevator housing 10 has a loading chute 11 near the bottom of its front wall and a discharge chute 12 near the top of the back wall.

Within the housing 10, an inside belt loop 13 is adapted to travel around head drum 14 and tail drum 15 mounted respectively on horizontal rotary shafts 16 and 17 in vertical alignment.

An outside belt loop, comprising a pair of narrow belts 18 and 19 of equal length and spaced parallel to each other, is adapted to rotate around flanged end portions of head drum 14 on opposite sides of belt loop 13, and around tail pulleys 20 and 21 adapted to freely rotate on shaft 17 on opposite sides of tail drum 15. The outside belt loop 18—19 also passes around coaxial idler pulleys 22 and 23 and around coaxial idler head pulleys 24 and 25. The diameters of the pulleys 20 and 21 may be equal to or slightly greater than the diameter of the tail drum 15. The idler pulleys 22 and 23 are spaced laterally from the pulleys 20 and 21 and below the loading chute 11. The head idler pulleys 24 and 25 are spaced laterally from and slightly above the head drum 14. The axes of all the pulleys and drums are parallel. The pulleys 20, 22, and 24, carrying the narrow belt 18 of the outside loop, are all in the same plane. Pulleys 21, 23, and 25, carrying narrow belt 19 of the outside belt loop, are in the same plane and in a plane parallel to that of belt 18.

Suspended from and between the inside belt loop 13 and the outside belt loop 18—19 are a plurality of spaced flexible slings 26. The slings may be made of any type flexible material, such as canvas, rubber, plastic, wire mesh, or chain metal, so long as they are adapted to carry the type of load for which they are designed and are adapted to yield to the path of the belt loops over the drums and pulleys. One edge of each sling 26 is attached to the inside belt loop 13 at equal intervals 27. Likewise, the opposite edge of each sling 26 is attached at equal intervals to the outside belt loop 18—19 by bars 28. A bar 28 may be formed by folding a strip of flat steel over the edge of the sling 26 and again folding the steel-encased edge back upon itself to securely clinch the edge and form a non-wearing surface for encountering the bobbins at the loading point. The bars 28 are attached to belt loop 18—19 in such a manner as to prevent rotation of the edge of sling 26 on bar 28. It has been found that by keeping the slings from rotating on bars 28, the slings will always return to loading position concave upward ready to receive a load. If allowed to rotate on bar 28, a sling will generally approach the loading point concave downward and out of position for receiving a load.

In the modification according to Figs. 2, 3 and 4, the length of each sling 26 is equal to the width of the belt loop 13. Thus, the belt 13 provides a side extending the entire length of the sling to retain a load in the sling while being elevated. Moreover, the length of each sling must be limited to the width of belt 13 in order that the slings may pass between the pulleys 20—25. The width of the slings 26 must be greater than the distance between the elevating portions of belt loops 13 and 18—19. It has been found that the problem of the bar 28 overcoming the dead center of pulleys 24—25 before the preceding sling releases its pull effect, is solved by providing slings 26 slightly wider than the greatest distance between the outer edges of head drum 14 and idler pulleys 24—25, by providing idler pulleys as large as possible, by spacing the slings on belt loop 13 a distance apart approximating the width of sling 26, and by slightly increasing the diameter of the end portions of head drum 14 over which the belt loops 18—19 pass.

Both belt loops are driven by head drum 14 through shaft 16 connected to any suitable source of power. Consequently, as inside belt loop 13 and outside belt loop 18—19 are carried over the drum 14 at the same velocity, the sling 26 supported thereby is stretched taut. As the belt loop 13 continues to travel over the drum 14 and descends toward the bottom of the elevator, the belt loop 13 pulls the sling and the outside belt loop 18—19 over the idler pulleys 24—25 by means of the taut sling 26. As the sling 26 becomes taut and inclined by virtue of the different elevations of the head drum 14 and the pulleys 24 and 25, any load carried by the sling is discharged through the discharge chute 12.

As the unloaded sling 26 and belt loops 13 and 18—19 descend, the sling collapses by virtue of the outside belt loop traveling at a slightly greater velocity than the inside belt loop. Since the descending portions of the inside and outside belt loops travel in very closely-spaced planes, the space necessary for the slings to return to loading position at the bottom of the elevator is at a minimum.

As best seen from Fig. 3 the idler pulleys 22 and 23 are so positioned within the housing 10 as to allow the travel of the belts 18 and 19 to spread open the slings 26 as they ascend to loading position.

The front wall 29 of the housing 10 is spaced from the outside belt loop a sufficient distance to allow a surplus load from any particular loaded sling 26 to spill over a bar 28 and descend to the loading chute 11, where the surplus may be reloaded upon another ascending sling 26.

As best seen in Figs. 3 and 4, vertical baffle plates 30 and 31 are spaced apart on opposite sides of the slings 26 to provide stationary retaining walls for the ascending slings.

A lip 32 in the discharge chute 12, extends inward toward the head drum 14 to provide a narrow slot just sufficient for the passage of the inside belt loop 13 and to direct all of the load through the discharge chute 12.

A deflector 33 is located beneath the loading chute 11 and generally parallel with that portion of the outside belt loop 18—19 between tail pulleys 20—21 and pulleys 22—23, to prevent loads from falling into the bottom of the housing 10.

Assuming the above-described sling conveyor to be used in elevating and discharging used bobbins from a textile winding machine, the operation of the machines is as follows:

Bobbins are introduced through the loading chute 11 to ascending slings 26. As a loaded sling approaches the top of the elevator, its inside edge 27 begins to travel over the head drum 14, while its outside edge, supported by bar 28, continues to travel vertically until the bar 28 begins to travel over pulleys 24 and 25. Continued travel of the inside edge 27 of sling 26 will stretch the sling to a taut inclined position, causing the bobbins to slide off the sling 26 over the lip 32 and out through the discharge chute 12. The discharged sling 26 will then descend in a relatively narrow space and assume an inverted collapsed position by virtue of the greater velocity of the outside belts 18 and 19. As the sling 26 travels around the tail drum 15, it is turned right-side up and begins to spread open by virtue of the pulleys 22 and 23 carrying the outside belts 18—19 in diverging paths from the inside belt loop 13. By the time the sling reaches its loading position, it is completely open again. The cycle may then be repeated indefinitely.

Referring now to the second modification disclosed in Figs. 5, 6 and 7, the housing 40 is provided near the bottom of its front wall 41 with a loading chute 42. Near the top of one of the side walls of the housing 40 is a discharge chute 43. Within the housing 40 is an inside belt loop comprising a pair of spaced parallel chains 44 and 45. The inside loop chains 44 and 45 pass over coaxial head sprockets 46. At the lower end of its travel, inside loop chain 44 passes over a plurality of idler and snubbing sprockets 47, and chain 45 passes over a plurality of idler and snubbing sprockets 48.

An outside belt loop comprising spaced parallel chains 49 and 50 pass over head sprockets 51 and 52 and around idler sprockets 53 and 54 at the bottom of the elevator. The chains 44, 45, 49 and 50 are all of equal length, and since the inside loop chains 44—45 are entirely within the path of the outside loop chains 49—50, the idler and snubbing sprockets 47 and 48 must be provided to take up the slack in the inside loop chains.

Slings 55 are suspended between the inside and outside belt loops in a similar manner as slings 26 in the first modification, except that in the second modification, the edges of the slings are supported by an inside rod 56, the ends of which are journaled in the chains 44 and 45, and the opposite edge of the sling 55 is supported by an outside rod 57 journaled in the chains 49 and 50. Again, the width of the slings must be greater than the distance between the ascending portions of the inside and outside belt loops, to provide load-carrying pockets.

The means of discharging sling 55 at the top of its travel is similar to that of sling 26 in the first modification. Sprockets 51 carrying the outside loop chains are slightly elevated above head sprockets 46 in order that the inside loop chains 44—45 will reverse their direction before the outside loop chains 49—50. The resulting action stretches taut and inclines the sling 55 suspended between the belt loops to discharge the load from the sling through the chute 43. The axes of sprockets 52 are in substantial vertical alignment with the axes of sprockets 46, and the diameters of sprockets 52 are only slightly greater than the diameters of sprockets 46 in order that the descending portions of the inside and outside belt loops will travel close together to minimize the space required for returning the unloaded sling to its loading position.

Since the inside and outside belt loop chains 44, 45, 49 and 50 are of equal length and travel at the same velocity, the opposite edges of each sling 55 are in substantially the same relative position to each other when either ascending or descending. Consequently, if the tops of the ascending slings are originally horizontal, then they will remain horizontal at any position of the elevator, and the descending unloaded slings will be held taut throughout their descent to the bottom of the elevator.

After the slings 55 have passed through the system of idler rollers 47, 48, 53, and 54, they are again in open right-side up position, ready to be loaded again.

The front wall 41 is spaced from the ends of the slings 55, instead of the edges as in the first modification, to allow the excess load to drop to the loading chute 42 and subsequently into a lower ascending sling. The baffle 58 is provided below the chute 42 to prevent any portion of the load from descending into the bottom of the elevator. Baffles may also be used as in the first modification to retain loads in the slings.

Head sprockets 46 may be driven by any suitable means, and sprockets 52 may be driven by sprockets 46 through gears or chains.

In both modifications, idlers 59 as disclosed in Fig. 6 may be disposed along the ascending travel of the belts to prevent the loaded slings from drawing the belts toward each other.

When a series of sling conveyors embodying the invention, as disclosed in Fig. 1, are employed to elevate a plurality of loads, such as used bobbins discharged from a plurality of textile winding machines 60, a horizontal conveyor such as belt conveyor 61 may be provided to receive the elevated loads discharged from each of the discharge chutes 12 of the sling conveyors. The belt conveyor 61 will thus transfer all of the scattered loads to a central disposal point.

Fig. 8 discloses a modification of the invention in which the direction of the belt loops have been reversed for lowering instead of elevating loads. The housing 70 is provided with a loading chute 71 and a discharge chute 72 in the front wall 73. The main difference in this modification is that the head-drum 74 supporting the inside belt loop 75 is above the head pulley 76 supporting the outside belt loop 77, and the tail drum 78 is above the tail pulley 79. In this manner a suitable pocket in the sling 80 is formed at the top of the travel for loading, and the sling 80 is stretched taut and inclined at the bottom of the travel for unloading.

Fig. 9 discloses a double conveyor system for elevating assorted loads, such as bobbins of different sizes. In this modification, a single housing 100 encloses a pair of units similar to those disclosed in Figs. 2, 3 and 4. However, a pair of inside belt loops 81 and 82 are mounted side by side to rotate on a single head drum, not shown, and a single tail drum 83. Likewise, a pair of outside belt loops 84, 85, 86 and 87 are mounted side by side to rotate on coaxial head pulleys, not shown, and coaxial tail pulleys 88, 89, 90, and 91. The assorted loads are selectively dumped upon slings 92 and 93 through loading chutes 94 and 95, elevated in a manner previously described, and discharged through chutes 96 and 97 to horizontal conveyors 98 and 99. Consequently, the assorted loads, such as bobbins of different sizes, remain separated throughout the conveying operation.

It has been found that the invention according to the first modification may be constructed at a materially lower cost than that disclosed in the second modification. Furthermore, the first modification is more adaptable for lighter loads, such as used bobbins from textile winding machines. Although the invention according to the second modification is more expensive to construct than that of the first modification, the second modification is more serviceable for heavier loads.

It is to be understood that the sling conveyors according to this invention may be adapted for elevating any type of load, and the system of sling conveyors may be adapted for use in conducting a plurality of loads, other than used bobbins, to a central disposal point. Scrap or other waste material in large plants or factories could be readily disposed of by such a system as that disclosed in Fig. 1.

It will be apparent to those skilled in the art that various changes may be made in the invention, without departing from the spirit and scope thereof, and therefore the invention is not limited by that which is shown in the drawings and described in the specification, but only as indicated in the appended claims.

What is claimed is:

1. An elevator comprising a pair of endless belts adapted to travel in the same direction and in the same vertical plane, the first of said belts forming a loop entirely within the loop formed by the second of said belts, flexible slings suspended between said belts, the ascending portions of said belts being parallel to and spaced sufficiently apart from each other to allow the slings to assume a load-carrying position, the descending portions of the belts being spaced sufficiently close to each other to allow the slings to assume an inverted collapsed position, and means for rotating said belts.

2. The invention according to claim 1 in which means are provided to stretch the slings as the travel of the belts is reversed from ascent to descent in order to discharge loads carried by the slings.

3. The invention according to claim 2 in which the means for stretching the slings comprises a first head drum over which the first endless belt must pass in reversing its direction of travel and a second head drum over which the second endless belt must pass in reversing its direction of travel, the second head drum being elevated slightly above the first head drum in order that the first endless belt may reverse its direction before the second endless belt to stretch the sling.

4. The invention according to claim 3 in which means are provided near the bottom of the travel of the belts for loading the ascending slings, means for discharging the load from the stretched slings, and baffle means for restraining the loads within the ascending slings.

5. An elevator comprising a first continuous belt means comprising a plurality of spaced chains of equal length adapted to travel in parallel paths, head pulleys over which said chains are adapted to reverse their direction of travel from ascent to descent, a second continuous belt means comprising a plurality of chains of equal length with the chains in the first belt means, a pair of second head pulleys spaced slightly above the first head pulleys and adapted to reverse the direction of the second chains from ascent to descent, flexible slings suspended between the first and second belt means, the ascending portions of said first and second chains being spaced parallel to and sufficiently apart from each other to allow the slings to assume load-supporting positions, the descending portions of said first and second chains being sufficiently close to each other to allow the slings to assume inverted collapsed positions, said first and second head pulleys being spaced sufficiently to allow the portion of the first belt means passing over the first head pulley to stretch the end of the sling carried thereby until the sling is stretched into a discharge position.

6. The invention according to claim 5 in which a plurality of snub rollers are provided over which the first belt means passes to take up slack therein.

7. A sling conveyor comprising a plurality of flexible slings, first and second belt means for elevating opposite sides of the slings in open position, means for loading the slings near the bottom of the sling conveyor, means for driving the belt means, a first head roller over which said first belt means is adapted to travel, a second head roller over which said second belt means is adapted to travel and spaced laterally from and slightly above the first head roller, the spacing of said head rollers being such that when the first belt means carries one side of a sling over the first head roller, the opposite side of the sling continues to rise with the second belt means until the sling is in a straight inclined unloading position, means for lowering said unloaded slings in inverted collapsed position to the bottom of the conveyor.

8. An elevator comprising a pair of endless belts adapted to travel in the same direction and in the same vertical plane, the first of said belts forming a loop entirely within the loop formed by the second of said belts, flexible slings suspended between said belts, the descending portions of said belts being parallel to and spaced sufficiently apart from each other to allow the slings to assume a load-carrying position, the ascending portions of the belts being spaced sufficiently close to each other to allow the slings to assume an inverted collapsed position, and means for moving said belts in the paths of their loops.

9. The invention according to claim 8 in which means are provided to stretch the slings as the travel of the belts is reversed from descent to ascent.

10. A sling conveyor comprising a plurality of flexible slings, first and second belt means for lowering opposite sides of the slings in open position, means for loading the slings near the top of the sling conveyor, means for driving the belt means, a first tail roller under which said first belt means is adapted to travel, a second tail roller under which said second belt means is adapted to travel and spaced laterally from and slightly below the first tail roller, the spacing of said tail rollers being such that when the first belt means carries one side of a sling under the first tail roller, the opposite side of the sling continues to descend with the second belt means until the sling is in a straight inclined unloading position, means for raising said unloaded slings in inverted collapsed position to the top of the conveyor.

11. A sling conveyor comprising a flexible sling, first and second belt means for moving opposite sides of the sling in the same direction, said belt means being spaced apart to spread the opposite sides of the sling to assume an open position during a portion of its travel, means for driving said belt means, a first roller means for reversing the travel of said first belt means, a second roller means for reversing the travel of said second belt means as soon as the reversal of the first belt means has stretched taut the sling carried thereby.

12. An elevator comprising a first continuous belt means, a head drum and a tail drum having horizontal axes in vertical alignment, and around which said first belt means is adapted to travel, a second continuous belt means of greater length than the first belt means, head pulleys and tail pulleys having horizontal axes, said second belt means being adapted to travel around said drums and said pulleys to form a loop around the loop formed by said first belt means, said head pulleys being spaced slightly above said head drum, a plurality of spaced flexible slings, each sling being fixedly suspended between said first and said second belt means, and drive means for rotating said head drum to stretch a sling to a taut discharge position when the belt means carrying said sling travel around said head drum and said head pulleys, and means for loading the ascending slings near the bottom of the elevator.

13. The invention according to claim 12 in which an elevator housing is provided, one of the vertical housing walls being spaced from the ascending slings to allow a surplus load to descend to successively lower slings.

References Cited in the file of this patent

UNITED STATES PATENTS

| 465,587 | Thorp | Dec. 22, 1891 |
| 1,920,981 | Gibbs | Aug. 8, 1933 |

FOREIGN PATENTS

| 6,831 | Great Britain | Sept. 19, 1912 |